United States Patent
Bhatt et al.

(10) Patent No.: US 11,954,434 B1
(45) Date of Patent: Apr. 9, 2024

(54) AUTOMATIC VALIDATION OF A HYBRID DIGITAL DOCUMENT

(71) Applicant: FMR LLC, Boston, MA (US)

(72) Inventors: Neha Pradeep Bhatt, Denton, TX (US); Renuka Arumugam, Chennai (IN); Kirankumar Raka, Morrisville, NC (US); Christopher Addison, Cary, NC (US); Mahesh Venkat Adusumelli, Frisco, TX (US)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 18/199,459

(22) Filed: May 19, 2023

(51) Int. Cl.
*G06F 17/00* (2019.01)
*G06F 40/226* (2020.01)
*G06V 30/412* (2022.01)
*G06V 30/42* (2022.01)

(52) U.S. Cl.
CPC .......... *G06F 40/226* (2020.01); *G06V 30/412* (2022.01); *G06V 30/42* (2022.01)

(58) Field of Classification Search
CPC ..... G06F 40/226; G06V 30/412; G06V 30/42
See application file for complete search history.

(56) References Cited

U.S. PATENT DOCUMENTS

| | | | |
|---|---|---|---|
| 7,299,408 B1 | 11/2007 | Daconta et al. | |
| 9,130,937 B1* | 9/2015 | Ostermann | H04L 63/0227 |
| 9,251,131 B2 | 2/2016 | McCabe et al. | |
| 10,776,563 B2 | 9/2020 | Hayslett et al. | |
| 2015/0207804 A1* | 7/2015 | Van Brink | H04L 65/403 |
| | | | 726/3 |
| 2016/0292505 A1* | 10/2016 | Agrawal | G06F 40/226 |
| 2017/0344245 A1* | 11/2017 | Kumar | G06F 21/645 |
| 2019/0179934 A1* | 6/2019 | Gogineni | G06F 3/04842 |
| 2020/0159647 A1* | 5/2020 | Puszkiewicz | G06F 11/3664 |
| 2020/0175120 A1* | 6/2020 | Bandyopadhyay | G06F 8/43 |
| 2021/0248144 A1* | 8/2021 | Haile | G06N 5/04 |
| 2022/0044058 A1* | 2/2022 | Zhang | G06V 10/22 |
| 2022/0309813 A1 | 9/2022 | Melchy et al. | |

OTHER PUBLICATIONS

R. Jana et al., "Optical Character Recognition from Text Image," International Journal of Computer Applications Technology and Research (IJCATR), vol. 3, Issue 4, pp. 239-243 (2014).
N. Subramani et al., "A Survey of Deep Learning Approaches for OCR and Document Understanding," arXiv:2011.13534v2 [cs.CL] Feb. 4, 2021, available at arxiv.org/pdf/2011.13534.pdf, 15 pages.

* cited by examiner

*Primary Examiner* — Andrew T McIntosh
(74) *Attorney, Agent, or Firm* — Cesari and McKenna, LLP

(57) ABSTRACT

Methods and apparatuses are described for automatic validation of a hybrid digital document. A server computing device downloads a hybrid digital document from a remote computing device, the hybrid digital document comprising an image content file and a hypertext content file. The server computing device determines content validation rules based upon one or more attributes associated with the hybrid digital document. The server computing device converts the image content file to a text content file. The server computing device validates one or more data elements in the text content file using the content validation rules. The server computing device validates one or more data elements in the hypertext content file using the content validation rules. The server computing device transmits a notification to the remote computing device indicating an outcome of the data elements validation.

30 Claims, 5 Drawing Sheets

FIG. 2

Account Holder Information

First Name: Bill
Last Name: Smith
D.O.B: 11/14/64

*Mailing Address*

Street: 22 Elm St.
City: Anywhere
State: NY
ZIP: 01234

Phone: 555-9454

Submit — 204

202

200

Brokerage Account Application

This is a request to open a new brokerage account at Fidelity Brokerage Services LLC ("Fidelity"). Please note that the data and elections below have been provided by your Authorized agent(s)/Advisor(s) on your behalf and must be carefully reviewed by you. If any of the information contained within this document is not accurate, you must reject the application and reach out to your Authorized agent(s)/Advisor(s). All fields should be confirmed by you prior to signing.

Account Information

Account Details
- Account #
- Account Type — Individual
- Account Owners

Authorized Agents/Advisors
- Primary Agent/Advisor
- Additional Agents/Advisors

Account Owner

Account Owner Information
- Name
- SSN
- Date of Birth
- Country of Citizenship — United States of America
- Country of Tax Residence — United States of America

Contact Information
- Mobile Phone

```xml
<?xml version="1.0" encoding="UTF-8"?><SystemsTeam_XML>
<Test Name="E2E_DOSDTE_IGO_Create_Account_Individual" Sta
<confirmation_number>         </confirmation_
<signers>
  <signer_firstname>         </signer_firstname>
  <signer_phonenumber>         </signer_phonenumber>
  <signer_middlename/>
  <signer_email>         </signer_email>
  <signer_lastname>         </signer_lastname>
</signers>
<signers>
  <signer_firstname>         </signer_firstname>
  <signer_phonenumber>         </signer_phonenumber>
  <signer_middlename>         </signer_middlename>
  <signer_email>         </signer_email>
  <signer_lastname>         </signer_lastname>
</signers>
<description/>
<accounts>
  <acc_number>         </acc_number>
  <acc_name/>
  <managedAccount>         </managedAccount>
  <ama>
    <level>         </level>
  </ama>
</accounts>
<trusted_contact_persons>
  <owner>         </owner>
  <tcp>
    <name>         </name>
    <relationship>         </relationship>
  </tcp>
  <tcp>
    <name>         </name>
```

500

AUTOMATIC VALIDATION OF A HYBRID DIGITAL DOCUMENT

TECHNICAL FIELD

This application relates generally to methods and apparatuses, including computer program products, for automatic validation of a hybrid digital document.

BACKGROUND

Many organizations—such as corporations, banks, government and regulatory agencies, and financial services advisors—are required to prepare complex, multi-sectioned digital documents such as agreements for execution by customers or other entities. Often, the generation and signing of these digital documents occurs during an automated e-signature application workflow. This type of workflow can collect customer information during a web-based onboarding process, use the collected information to generate a customized digital document (e.g., a Postscript Document Format (PDF) file) that pertains to the transaction, and employ a digital document execution platform to obtain the customer's e-signature on the document. Often, the generated digital document comprises a hybrid PDF including text/content in the form of an image and form-fillable fields where the user can perform an action (e.g., entering text, selecting a button, etc.) that is stored in a structured format (e.g., HTML). This type of digital document can be referred to as a 'hybrid digital document.' As can be appreciated, it is critically important that the information contained in the digital document, as well as the format and structure of the document, is accurate and complete. For example, the customer-specific information must be correctly entered into the document (i.e., in the proper fields) and the static information in the document must align with the corresponding transaction, including any organizational rules or regulatory requirements.

However, current document validation platforms are configured to perform only rudimentary text extraction (e.g., optical character recognition (OCR)) on the image-based portion of the hybrid digital documents. This type of text extraction is frequently inaccurate (especially for scanned images) and lacks the ability to confirm the accuracy of the document structure, format, and data values entered by the user. As a result, customers may encounter incorrect or incomplete documents during the e-signature process.

Also, because typical OCR algorithms only process image-based content of a hybrid digital document, separate tools are frequently needed to process the HTML content of the PDF. In addition, another drawback of existing OCR algorithms is that sometimes they only convert a part of the image-based content and not the entire document. The section-document package is generally comprised of multiple individual documents each with their own unique document identifiers, and it is vital to confirm the presence and structure and content of all specifically expected documents. Existing systems do not have any ability to confirm these business requirements.

SUMMARY

Therefore, what is needed are methods and systems for automatically validating aspects of a hybrid digital document to ensure that the documents presented to customers are in compliance with business process requirements and validation rules. The techniques described herein beneficially overcome the above-identified drawbacks of existing validation systems by providing for analysis and validation of both the image-based portion of a hybrid digital document, as well as the structured portion of the hybrid digital document. The methods and systems described herein can be integrated into an application workflow, such as an e-signature process, to advantageously enable automatic and seamless validation of a dynamically-generated hybrid digital document. Furthermore, by applying automated techniques as described herein, complex business requirements and flows can be incorporated to ensure high accuracy for image-based content.

The invention, in one aspect, features a computer system for automatic validation of a hybrid digital document, the system comprising a server computing device having a memory for storing computer-executable instructions and a processor that executes the computer-executable instructions. The server computing device downloads a hybrid digital document from a remote computing device, the hybrid digital document comprising an image content file and a hypertext content file. The server computing device determines content validation rules based upon one or more attributes associated with the hybrid digital document. The server computing device converts the image content file to a text content file. The server computing device validates one or more data elements in the text content file using the content validation rules. The server computing device validates one or more data elements in the hypertext content file using the content validation rules. The server computing device transmits a notification to the remote computing device indicating an outcome of the data elements validation.

The invention, in another aspect, features a computerized method of automatic validation of a hybrid digital document. A server computing device downloads a hybrid digital document from a remote computing device, the hybrid digital document comprising an image content file and a hypertext content file. The server computing device determines content validation rules based upon one or more attributes associated with the hybrid digital document. The server computing device converts the image content file to a text content file. The server computing device validates one or more data elements in the text content file using the content validation rules. The server computing device validates one or more data elements in the hypertext content file using the content validation rules. The server computing device transmits a notification to the remote computing device indicating an outcome of the data elements validation.

Any of the above aspects can include one or more of the following features. In some embodiments, the one or more attributes associated with the hybrid digital document comprise a workflow, a document type, a form ID, an account type, or a transaction type. In some embodiments, the server computing device selects one or more content validation rules from a repository after identifying the one or more attributes associated with the hybrid digital document. In some embodiments, the content validation rules comprise programmatic instructions for analyzing one or more of: a data element format, a data element value, a data element sequence, a data element location, or a data element structure. In some embodiments, validating the one or more data elements in the text content file comprises, for each data element: extracting a first value associated with the data element from the text content file, comparing the first value with an expected value associated with the data element stored in a database, and determining a match between the first value and the expected value.

In some embodiments, validating the one or more data elements in the text content file comprises, for each data element: determining a first format associated with the data element in the text content file, comparing the first format to an expected format associated with the data element stored in a database, and determining a match between the first format and the expected format. In some embodiments, validating the one or more data elements in the text content file comprises, for each data element: determining a first position of the data element in the text content file, comparing the first position to an expected position of the data element stored in a database, and determining a match between the first position and the expected position.

In some embodiments, validating the one or more data elements in the text content file comprises determining a first sequence of a plurality of the data elements in the text content file, comparing the first sequence to an expected sequence of the plurality of the data elements stored in a database, and determining a match between the first sequence and the expected sequence. In some embodiments, validating one or more data elements in the hypertext content file comprises, for each data element: extracting a first value associated with the data element from the hypertext content file, comparing the first value with an expected value associated with the data element stored in a database, and determining a match between the first value and the expected value.

In some embodiments, validating the one or more data elements in the hypertext content file comprises, for each data element: determining a first format associated with the data element in the hypertext content file, comparing the first format to an expected format associated with the data element stored in a database, and determining a match between the first format and the expected format. In some embodiments, the first format comprises font, font size, font style, color, table properties, list properties, or structure properties.

In some embodiments, validating the one or more data elements in the hypertext content file comprises, for each data element: determining a first position of the data element in the hypertext content file, comparing the first position to an expected position of the data element stored in a database, determining a match between the first position and the expected position. In some embodiments, validating the one or more data elements in the text content file comprises determining a first sequence of a plurality of the data elements in the hypertext content file, comparing the first sequence to an expected sequence of the plurality of the data elements stored in a database, and determining a match between the first sequence and the expected sequence.

In some embodiments, the hybrid digital document comprises a document for e-signature by an end user. In some embodiments, upon receiving the notification, the remote computing device continues an e-signature workflow with the end user.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 2 is a diagram of an exemplary web form provided by UI module.

FIG. 4 is a diagram of a portion of an exemplary image content file of a hybrid digital document.

FIG. 5 is a diagram of a portion of an exemplary hypertext content file of a hybrid digital document.

DETAILED DESCRIPTION

Figure 1:
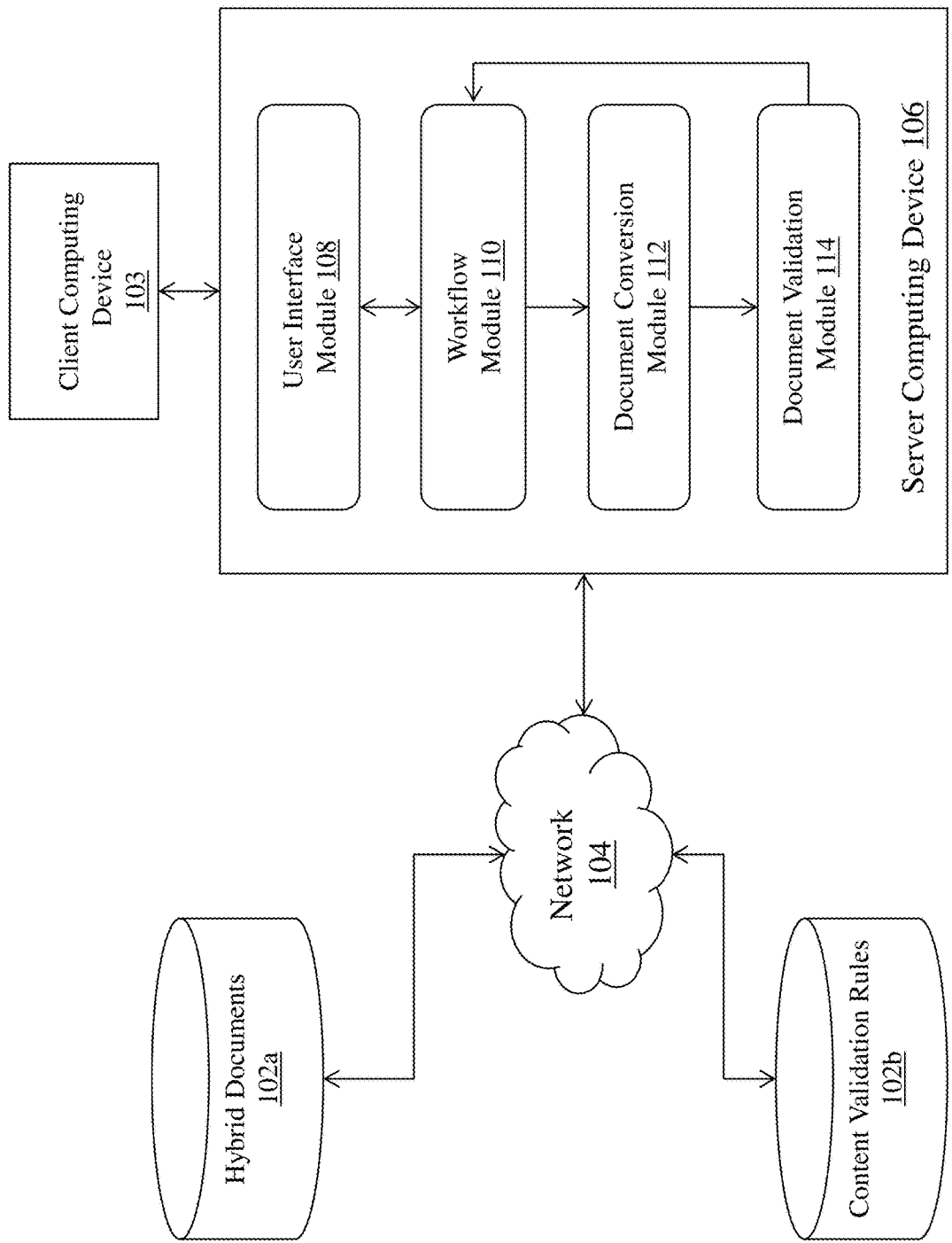
FIG. 1 is a block diagram of a system for automatic validation of a hybrid digital document.

FIG. 1 is a block diagram of system 100 for automatic validation of a hybrid digital document. System 100 includes hybrid documents database 102*a*, content validation rules database 102*b*, client computing device 103, communications network 104, server computing device 106 that includes user interface module 108, workflow module 110, document conversion module 112, and document validation module 114.

Databases 102*a*, 102*b* are located on a single database server computing device 102 (or in some embodiments, on a plurality of database server computing devices) coupled to server computing device 106 and are configured to receive, generate, and store specific segments of data relating to the process of automatic validation of a hybrid digital document as described herein. In some embodiments, at least a portion of databases 102*a*, 102*b* can be integrated with server computing device 106 or be located on a separate computing device or devices (i.e., database server 102). Databases 102*a*, 102*b* can be configured to store portions of data used by the other components of system 100, as will be described in greater detail below. In some embodiments, databases 102*a*, 102*b* are located in a cloud storage infrastructure comprising one or more nodes accessible by server computing device 106.

Hybrid documents database 102*a* includes a plurality of digital documents in one or more defined hybrid file formats. In this context, a hybrid digital document comprises at least two files that represent the document: i) an image content file and ii) a hypertext content file. In some embodiments, the hybrid digital document is stored in Portable Document Format™ (PDF) from Adobe®, where the image content file comprises a scanned/image-based PDF file (e.g., .jpg, .png, .tiff, or other type of image format) that contains the text/content of the document as displayed to the end user, and the hypertext content file comprises a structured data file that contains data and metadata, such as Hypertext Markup Language (HTML) tags, corresponding to the dynamic user input fields—e.g., buttons, radio buttons, checkboxes, text boxes, etc.—in the digital document. In some embodiments, the digital documents in database 102*a* comprise complex transactional documents (such as agreements) that typically include a plurality of text sections and sub-sections with both static data fields and dynamic data fields that comprise data specific to one or more recipients of the document. These documents are often configured for transmission to one or more recipients in order to obtain an electronic signature using an e-signature processing workflow.

Content validation rules database 102*b* includes a plurality of processing rules used by document validation module 114 to analyze and validate the content and structure of a hybrid digital document. In some embodiments, the content validation rules stored in database 102b comprise programmatic instructions that, when executed by module 114, operate to analyze data and/or metadata associated with a hybrid digital document to verify, e.g., that the document content and structure are correct for a given end user. The content validation rules can represent business objectives or requirements, compliance standards, privacy requirements, document structure or formatting preferences, file definitions, or other types of guidelines that govern the appearance, content, and/or structure of a hybrid digital document.

Client computing device 103 connect to the communications network 104 in order to communicate with server computing device 106 to provide input and receive output relating to the process for automatic validation of a hybrid digital document as described herein. Client computing device 103 can be coupled to a display device (not shown), such as a monitor or screen. For example, client computing device 103 can provide a graphical user interface (GUI) via the display device to a user of the corresponding device that presents output resulting from the methods and systems described herein and receives input from the user for further processing. In some embodiments, client computing device 103 is associated with a recipient of a digital document, such as a customer or end user, and device 103 can receive and display the digital document to the end user for application of an e-signature.

Exemplary client computing devices 103 include but are not limited to desktop computers, laptop computers, tablets, and mobile devices (e.g., smartphones). It should be appreciated that other types of computing devices that are capable of connecting to the components of the system 100 can be used without departing from the scope of invention. Although FIG. 1 depicts a single client computing device 103, it should be appreciated that system 100 can include any number of client computing devices.

Communications network 104 enables database server 102 with databases 102a, 102b, client computing device 103, and server computing device 106 to communicate with each other. Network 104 is typically a wide area network, such as the Internet and/or a cellular network. In some embodiments, network 104 is comprised of several discrete networks and/or sub-networks (e.g., cellular to Internet).

Server computing device 106 is a device including specialized hardware and/or software modules that execute on one or more processors and interact with memory modules of server computing device 106, to receive data from other components of system 100, transmit data to other components of system 100, and perform functions for automatic validation of a hybrid digital document as described herein. Server computing device 106 includes several computing modules 108, 110, 112, 114 that execute on the processor of the server computing device 106. In some embodiments, modules 108, 110, 112, 114 are specialized sets of computer software instructions programmed onto one or more dedicated processors in the server computing device 106 and can include specifically designated memory locations and/or registers for executing the specialized computer software instructions.

Although modules 108, 110, 112, 114 are shown in FIG. 1 as executing within the same server computing device 106, in some embodiments the functionality of modules 108, 110, 112, 114 can be distributed among a plurality of server computing devices. As shown in FIG. 1, server computing device 106 enables modules 108, 110, 112, 114 to communicate with each other in order to exchange data for the purpose of performing the described functions. It should be appreciated that any number of computing devices, arranged in a variety of architectures, resources, and configurations (e.g., cluster computing, virtual computing, cloud computing) can be used without departing from the scope of the invention. The exemplary functionality of modules 108, 110, 112, 114 is described in detail below.

Generally, a hybrid digital document is generated during a processing or transaction workflow—for example, a user at client computing device 103 may wish to open a new account. The user at client computing device 103 opens browser software and establishes a connection to user interface (UI) module 108 of server computing device 106, which provides an application interface and functionality for opening a new account. In some embodiments, the user authenticates to server computing device 106 via one or more authentication credentials to gain access to the account opening application interface. The user then provides input to UI module 108 via client computing device 103 to initiate an account opening application workflow. During the account opening process, workflow module 110 collects certain information from the user that is required for account opening—such as user identifiable information, demographic information, contact information, asset information, beneficiary information, policy acknowledgements, and so forth. The information can be collected from the user via one or more web forms using browser software installed on client computing device 103, where the user enters information into form fields and submits the web form to workflow module 110. FIG. 2 is a diagram of an exemplary web form 200 provided by UI module 108 to client computing device 103. As shown in FIG. 2, the user can provide personal information such as name, address, etc. in corresponding input fields 202 and click the Submit button 204 to transfer the data values to UI module 108 and workflow module 110. Once the required information has been collected, workflow module 110 generates a hybrid digital document that contains some or all of the collected information in specifically designated fields in the document. As mentioned above, the hybrid digital document comprises an image content file and a hypertext content file.

Workflow module 110 then prepares the hybrid digital document for electronic signature by the user at client computing device 103 via an e-signature processing workflow. In some embodiments, workflow module 110 transmits the generated hybrid digital document to an e-signature service (such as DocuSign®) for packaging and transmission of the hybrid digital document to the user at client computing device 103. For example, the external e-signature service can prepare the hybrid digital document for e-signature by highlighting certain dynamic fields for user review and completion, creating an envelope for the document with user contact information and user instructions, and generating electronic communications, such as an e-mail with a link to access the document, to be sent to the user for review and signature of the document. Workflow module 110 can transmit the electronic communications to client computing device 103.

When the user at client computing device 103 receives the electronic communications and clicks the link, in some embodiments workflow module 110 authenticates the client device 103 and/or the user (e.g., sending a one-time password to a mobile device associated with the user and prompting the user to enter the one-time password). Upon successful authentication, workflow module 110 instructs the e-signature service to provide the hybrid digital document to the user for review and e-signature. The e-signature service transmits the hybrid digital document (including the image content file and the hypertext content file) to hybrid documents database 102a for storage and retrieval by workflow module 110.

Figure 3:
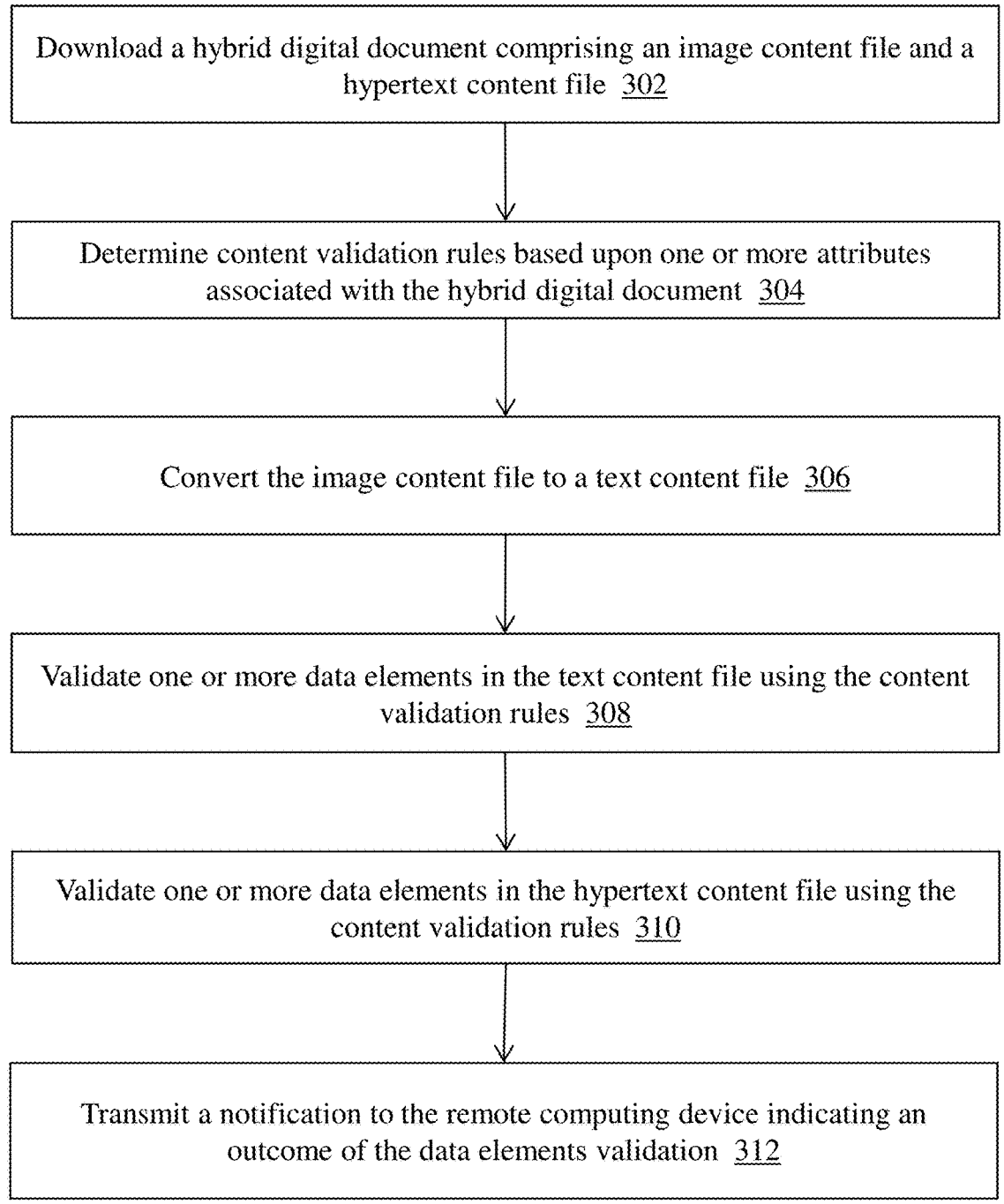
FIG. 3 is a flow diagram of a computerized method of automatic validation of a hybrid digital document.

Prior to sending the hybrid digital document to client computing device 103 for e-signature, workflow module 110 initiates a document analysis and validation workflow to ensure the hybrid digital document is accurate and complete based upon one or more content validation rules. FIG. 3 is a flow diagram of a computerized method 300 of automatic validation of a hybrid digital document, using system 100 of FIG. 1. Workflow module 110 downloads (step 302) a hybrid digital document comprising an image content file and a hypertext content file from, e.g., hybrid documents database 102a via network 104. For example, workflow module 110 can receive an identifier associated with the hybrid digital document from the e-signature service in order to search for and retrieve the hybrid digital document files from database 102a. In some embodiments, the identifier is a document ID or other alphanumeric string that indicates a unique identity of the generated hybrid digital document as stored in database 102a.

Upon downloading the hybrid digital document, workflow module 110 determines (step 304) content validation rules for analyzing the hybrid digital document based upon one or more attributes associated with the hybrid digital document. As mentioned above, the content validation rules generally comprise instructions to analyze and validate the content and structure of a hybrid digital document, to ensure that the document includes accurate and complete information-including validation of the information previously submitted by the user at client computing device 103 during the initial steps of the workflow process. Workflow module 110 can determine and select one or more content validation rules based upon any of a number of different attributes associated with the hybrid digital document, including but not limited to, an application workflow for which the digital document is generated, a document type of the digital document, a form ID of the digital document, an account type associated with the digital document, or a transaction type associated with the digital document. As one example, workflow module 110 can determine that the hybrid digital document was generated as part of an account opening workflow using, e.g., data/metadata associated with the document that is stored in hybrid documents database 102a. In this example, the data/metadata associated with the document can include a workflow identifier (e.g., ID "AcctOpen") which identifies the account opening application workflow. Workflow module 110 extracts the workflow identifier for the document from hybrid documents database 102a and searches content validation rules database 102b for one or more rules that correspond to the extracted identifier.

In some embodiments, the content validation rules are configured to identify one or more data fields that should appear in the hybrid digital document and confirm that the data fields appear in the document. For example, an account opening agreement may comprise a plurality of static data fields and/or dynamic data fields that are preferred or required to be included in the document—e.g., static data fields like section headings, instructions for completion, legal notices, etc. and dynamic data fields like signer name and mailing address, email address, account number, account type, trusted contact person name and mailing address, e-signature, date signed, among others. As described above, the information contained in the dynamic data fields can be provided by a user at client computing device 103 (e.g., via web forms) during one or more initial steps of the account opening workflow process. Workflow module 110 can retrieve one or more rules from database 102b that when executed, analyze the hybrid digital document (as described below) to validate the data elements associated with the document.

In some embodiments, the content validation rules can also include programmatic instructions for analyzing one or more of: a data element format, a data element value, a data element sequence, a data element location, or a data element structure. For example, an account number on the account opening form may be required to have a specific format (e.g., '01234-567') or be located in a specific section of the document. The content validation rules can be configured to analyze the hybrid digital document to confirm certain characteristics of each data element.

As mentioned previously, the hybrid digital document as stored in database 102a comprises an image content file and a hypertext content file. FIG. 4 is a diagram of a portion of an exemplary image content file 400 of a hybrid digital document. As shown in FIG. 4, the image content file 400 comprises one or more images that represent the digital document as displayed to a viewer (e.g., a user at client computing device 103). In some embodiments, the image content file comprises a scanned/image-based file such as a PDF. A scanned/image-based PDF is a compact type of document in the form of an image. Generally, this type of PDF is the result of conversion of a camera image, or of a .jpg, .png or .tiff file format. Because these PDFs are image-based, corresponding information and metadata about attributes of the document content are typically unavailable-which makes extraction of metadata, attributes, style, content etc. challenging. The methods and systems described herein overcomes these challenges to advantageously provide for validation of image-based PDFs.

Each of these content files are provided to document conversion module 112 which converts (step 306) the image content file to a text content file. In some embodiments, document conversion module 112 executes one or more optical character recognition (OCR) algorithms to process the image content file, extract the text content in the image file, and generate a text content file that corresponds to the text extracted from the image file. Exemplary OCR algorithms used by document conversion module 112 can include, but are not limited to, traditional OCR algorithms such as described in R. Jana et al., "Optical Character Recognition from Text Image," International Journal of Computer Applications Technology and Research (IJ-CATR), Vol. 3, Issue 4, pp. 239-243 (2014), and machine-learning based OCR algorithms such as those described in N. Subramani et al., "A Survey of Deep Learning Approaches for OCR and Document Understanding," arXiv: 2011.13534v2 [cs.CL] 4 Feb. 2021, available at arxiv.org/pdf/2011.13534.pdf, each of the above documents incorporated herein by reference.

Document validation module 114 receives the text content file generated by module 112 and the hypertext content file from database 102a. Module 114 validates (step 308) one or more data elements in the text content file using the content validation rules retrieved from database 102b. As can be appreciated, validation of the data elements can comprise any of a number of different operations, e.g., to confirm the existence and/or accuracy of certain data element values and/or characteristics. In some embodiments, validation of one or more data elements comprises extracting a first value associated with the data element from the text content file, comparing the first value with an expected value associated with the data element stored in a database, and determining a match between the first value and the expected value. As just one example, a hybrid digital document can comprise a dynamic data field that contains a particular value, such as a text string with the signer's first name, as captured by system 100 during the account opening application process. Document validation module 114 extracts the value for the first name data field and compares the value to a stored value (e.g., the customer's first name as contained in a user profile) to confirm that the two values match. If a discrepancy between the two values is detected, document validation module 114 can record the error, e.g., in a validation log and transmit a message to a remote computing device that notifies personnel of the error.

In addition to confirming that the values match, document validation module 114 can also verify that a format of the data element matches an expected format. For example, a hybrid digital document can comprise a dynamic data field that contains an identification number (e.g., social security number (SSN)) that is provided by the user during review and signature of the hybrid digital document. The identification number may require a particular format, e.g., xxx-xx-xxxx in the case of a SSN, where x corresponds to a digit of the number. Document validation module 114 can determine that the dynamic data field is assigned as an SSN and use the content validation rules to select or retrieve an expected format of the data field from a data source (e.g., database 102a). Module 114 extracts the value of the dynamic data field from the text content file and analyzes the data field to determine a format of the data entered in the field. Module 114 then compares the format of the data provided by the user in the dynamic data field to the expected format as retrieved from the data source and determines whether the two formats match. As an example, a user could make a mistake when entering their SSN by, e.g., typing the number in the following format: xx-xxx-xxxx. Module 114 compares this format to the expected format of xxx-xx-xxxx and determines that a mismatch exists. Module 114 can record the error, e.g., in a validation log and transmit a message to a remote computing device that notifies personnel of the error. In some embodiments, module 114 can transmit a notification to the user signing the document at client computing device 103 that prompts the user to correct the data entry error.

Document validation module 114 can also utilize the text content file to validate one or more other characteristics of the data fields in the document, such as position, location, or sequence. For example, certain data fields may be required to be placed in specific sections or locations in the hybrid digital document—e.g., a business may want the new account number for an account opening agreement to appear on every page of the document. Document validation module 114 can analyze the text content file to confirm that the account number value is located on each page in the desired location. In some embodiments, when generating the text content file, document conversion module 112 can insert page break indicators between text content that appears on each page of the document. A page break indicator can be a sequence of characters that is not likely to occur naturally in a given document—e.g., a series of special characters '&$_*'. Therefore, when encountering a page break indicator, document validation module 114 can analyze the extracted text content that appears between page break indicators as a single page of the document for the purposes of determining whether expected text is correctly located on each page of the document.

It should be appreciated that any of the above validation processes can be performed by document validation module 114 for the static data fields that make up the hybrid digital document. As an example, due to business objectives or regulatory requirements, a hybrid digital document may need to include specific legal notices in one or more sections of the document. Document validation module 114 can be configured to extract the text from the text content file and compare the extracted text to expected text for those sections. If the two text sections do not match, module 114 can record the error and transmit a message notifying appropriate personnel for investigation and remediation. For example, an organization may want the first paragraph in an account opening agreement to read as follows:

This Account Agreement applies to new and existing consumer and business accounts and, together with the following documents, is your contract with XYZ Bank and constitutes the "Agreement" that governs your account with XYZ Bank.

Document validation module 114 can compare this portion of the text content file to a corpus of text stored in, e.g., database 102b to determine whether the text content matches. If module 114 identifies a problem with the text (e.g., missing words or punctuation, misspellings, etc.), module 114 can transmit a notification message to a remote computing device for review and analysis by support personnel. The notification message can include a summary of the error, including the digital document in which the error was found.

Turning back to FIG. 2, document validation module 114 also validates (step 310) one or more data elements in the hypertext content file using the content validation rules stored in, e.g., database 102b. As mentioned above, each hybrid digital document comprises a text content file and a hypertext content file. The hypertext content file comprises programmatic code in a structured format (i.e., HTML) that represents the expected content and structure of the digital document, including any static and/or dynamic data fields that appear in the document. In some embodiments, at least a portion of the hypertext content file is generated or updated during the initial data gathering steps of the workflow—i.e., when the user at client computing device 103 provides input to one or more web forms, workflow module 108 captures the input from the web form fields and stores the input data in the hypertext content file. FIG. 5 provides an exemplary portion of the hypertext content file 500 for a hybrid digital document. As shown in FIG. 5, the hypertext content file 500 includes a plurality of HTML tags 502 (e.g., '<signer_firstname>', '<signer_phonenumber>', etc.) that correspond to dynamic data fields in the hybrid digital document. As can be appreciated, these fields contain data elements provided by the user at client computing device 103 during the initial steps of the account opening workflow process. Document validation module 114 parses the hypertext content file and compares the content, structure, and format of the HTML code—including values contained in each HTML tag—to the expected content, structure, and format as contained in, e.g., database 102b. For example, document validation module 114 can compare the value contained in the <signer_firstname> tag in the hypertext content file to the value extracted from the image content file corresponding to the first name field. Document validation module 114 confirms that the data values match and proceeds to the next tag in the hypertext content file. When one or more data values do not match, document validation module 114 can flag the mismatch and generate a notification message to a remote computing device that indicates a problem with the hybrid digital document.

In some embodiments, document validation module 114 can further analyze the hypertext content file to validate one or more of a format, a position, and/or a sequence of data fields in the hybrid digital document. HTML tags can incorporate different HTML attributes, such as font type (e.g., Arial), font size, font style, color, table properties, list properties, or other structure properties. Document validation module 114 can compare any of these HTML attributes and the corresponding values to expected attributes and values as stored in database 102b. For example, the hypertext content file may assign a font size of 12 px to a signer first name field but the expected value can be 14 px—resulting in a mismatch. When a mismatch occurs, module 114 can flag the mismatch and generate a notification message to a remote computing device that indicates a problem with the hybrid digital document.

Upon completing the validation process as described above, document validation module 114 transmits a notification to a remote computing device indicating an outcome of the data elements validation. For example, when validation completes successfully, module 114 transmits a notification to the remote computing device that the hybrid digital document is complete and accurate. In some embodiments, the remote computing device can be client computing device 103, which initiated the document workflow process via workflow module 108. Upon receiving the notification that document verification was successful, client computing device 103 can continue an e-signature workflow for the document. In some embodiments, workflow module 108 receives the notification from document verification module 114 instead of, or in addition to, the remote computing device. Workflow module 108 can also continue the e-signature workflow with client computing device 103 upon receiving the notification. In some embodiments, workflow module 108 and/or client computing device 103 presents the hybrid digital document to the user and requests that the user provide an e-signature to formalize the agreement.

It should be appreciated that the hybrid digital document verification process described herein can occur prior to presenting the completed hybrid digital document to an end user, e.g., for signature (as described above) and/or after capturing the end user's signature during an application workflow. For example, document verification module 114 can be configured to confirm the presence and location of the end user's signature in the hybrid digital document after signing, to ensure both that the document is complete and accurate, and that the user has completed the e-signature process successfully. Furthermore, the techniques described herein can be used in the context of testing a document generation system to confirm that hybrid digital documents are being generated properly. For example, a development or QA team can deploy the document conversion and validation methods of the present system in a software testing or workflow verification computing system to test application code that generates hybrid digital documents. In this way, the personnel can quickly determine whether their code is able to produce digital documents that are accurate and complete and identify potential problems with the application code based on the document validation results.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A computer system for automatic validation of content in a hybrid digital document, the system comprising a server computing device having a memory for storing computer-executable instructions and a processor that executes the computer-executable instructions to:
   download a hybrid digital document from a remote computing device, the hybrid digital document comprising an image-based PDF file and a hypertext content file including one or more dynamic user input fields;
   determine content validation rules based upon one or more attributes associated with the hybrid digital document, including identifying a workflow in which the hybrid digital document was generated and selecting one or more content validation rules based upon the workflow;
   convert the image-based PDF file to a text content file;
   validate one or more data elements in the text content file using the content validation rules;
   validate one or more data elements in the hypertext content file using the content validation rules, including comparing a value for one of the dynamic user input fields to a value of a corresponding field as extracted from the image-based PDF file; and
   transmit a notification to the remote computing device indicating an outcome of the data elements validation.

2. The system of claim 1, wherein the one or more attributes associated with the hybrid digital document comprise a document type, a form ID, an account type, or a transaction type.

3. The system of claim 2, wherein the server computing device selects one or more content validation rules from a repository after identifying the one or more attributes associated with the hybrid digital document.

4. The system of claim 3, wherein the content validation rules comprise programmatic instructions for analyzing one or more of: a data element format, a data element value, a data element sequence, a data element location, or a data element structure.

5. The system of claim 4, wherein validating the one or more data elements in the text content file comprises, for each data element:
   extracting a first value associated with the data element from the text content file;
   comparing the first value with an expected value associated with the data element stored in a database; and
   determining a match between the first value and the expected value.

6. The system of claim 4, wherein validating the one or more data elements in the text content file comprises, for each data element:
   determining a first format associated with the data element in the text content file;
   comparing the first format to an expected format associated with the data element stored in a database; and
   determining a match between the first format and the expected format.

7. The system of claim 4, wherein validating the one or more data elements in the text content file comprises, for each data element:
- determining a first position of the data element in the text content file;
- comparing the first position to an expected position of the data element stored in a database; and
- determining a match between the first position and the expected position.

8. The system of claim 4, wherein validating the one or more data elements in the text content file comprises:
- determining a first sequence of a plurality of the data elements in the text content file;
- comparing the first sequence to an expected sequence of the plurality of the data elements stored in a database; and
- determining a match between the first sequence and the expected sequence.

9. The system of claim 4, wherein validating one or more data elements in the hypertext content file comprises, for each data element:
- extracting a first value associated with the data element from the hypertext content file;
- comparing the first value with an expected value associated with the data element stored in a database; and
- determining a match between the first value and the expected value.

10. The system of claim 4, wherein validating the one or more data elements in the hypertext content file comprises, for each data element:
- determining a first format associated with the data element in the hypertext content file;
- comparing the first format to an expected format associated with the data element stored in a database; and
- determining a match between the first format and the expected format.

11. The system of claim 10, wherein the first format comprises font, font size, font style, color, table properties, list properties, or structure properties.

12. The system of claim 4, wherein validating the one or more data elements in the hypertext content file comprises, for each data element:
- determining a first position of the data element in the hypertext content file;
- comparing the first position to an expected position of the data element stored in a database; and
- determining a match between the first position and the expected position.

13. The system of claim 4, wherein validating the one or more data elements in the hypertext content file comprises:
- determining a first sequence of a plurality of the data elements in the hypertext content file;
- comparing the first sequence to an expected sequence of the plurality of the data elements stored in a database; and
- determining a match between the first sequence and the expected sequence.

14. The system of claim 1, wherein the hybrid digital document comprises a document for e-signature by an end user.

15. The system of claim 14, wherein upon receiving the notification, the remote computing device continues an e-signature workflow with the end user.

16. A computerized method of automatic validation of content in a hybrid digital document, the method comprising:
- downloading, by a server computing device, a hybrid digital document from a remote computing device, the hybrid digital document comprising an image-based PDF file and a hypertext content file including one or more dynamic user input fields;
- determining, by the server computing device, content validation rules based upon one or more attributes associated with the hybrid digital document, including identifying a workflow in which the hybrid digital document was generated and selecting one or more content validation rules based upon the workflow;
- converting, by the server computing device, the image-based PDF file to a text file;
- validating, by the server computing device, one or more data elements in the text file using the content validation rules;
- validating, by the server computing device, one or more data elements in the hypertext content file using the content validation rules, including comparing a value for one of the dynamic user input fields to a value of a corresponding field as extracted from the image-based PDF file; and
- transmitting, by the server computing device, a notification to the remote computing device indicating an outcome of the data elements validation.

17. The method of claim 16, wherein the one or more attributes associated with the hybrid digital document comprise a document type, a form ID, an account type, or a transaction type.

18. The method of claim 17, wherein the server computing device selects one or more content validation rules from a repository after identifying the one or more attributes associated with the hybrid digital document.

19. The method of claim 18, wherein the content validation rules comprise programmatic instructions for analyzing one or more of: a data element format, a data element value, a data element sequence, a data element location, or a data element structure.

20. The method of claim 19, wherein validating the one or more data elements in the text content file comprises, for each data element:
- extracting a first value associated with the data element from the text content file;
- comparing the first value with an expected value associated with the data element stored in a database; and
- determining a match between the first value and the expected value.

21. The method of claim 20, wherein validating the one or more data elements in the text content file comprises, for each data element:
- determining a first format associated with the data element in the text content file;
- comparing the first format to an expected format associated with the data element stored in a database; and
- determining a match between the first format and the expected format.

22. The method of claim 16, wherein validating the one or more data elements in the text content file comprises, for each data element:
- determining a first position of the data element in the text content file;
- comparing the first position to an expected position of the data element stored in a database; and
- determining a match between the first position and the expected position.

23. The method of claim 16, wherein validating the one or more data elements in the text content file comprises:

determining a first sequence of a plurality of the data elements in the text content file;

comparing the first sequence to an expected sequence of the plurality of the data elements stored in a database; and determining a match between the first sequence and the expected sequence.

24. The method of claim 16, wherein validating one or more data elements in the hypertext content file comprises, for each data element:

extracting a first value associated with the data element from the hypertext content file;

comparing the first value with an expected value associated with the data element stored in a database; and determining a match between the first value and the expected value.

25. The method of claim 16, wherein validating the one or more data elements in the hypertext content file comprises, for each data element:

determining a first format associated with the data element in the hypertext content file;

comparing the first format to an expected format associated with the data element stored in a database; and determining a match between the first format and the expected format.

26. The method of claim 25, wherein the first format comprises font, font size, font style, color, table properties, list properties, or structure properties.

27. The method of claim 16, wherein validating the one or more data elements in the hypertext content file comprises, for each data element:

determining a first position of the data element in the hypertext content file;

comparing the first position to an expected position of the data element stored in a database; and determining a match between the first position and the expected position.

28. The method of claim 16, wherein validating the one or more data elements in the hypertext content file comprises:

determining a first sequence of a plurality of the data elements in the hypertext content file;

comparing the first sequence to an expected sequence of the plurality of the data elements stored in a database; and determining a match between the first sequence and the expected sequence.

29. The method of claim 16, wherein the hybrid digital document comprises a document for e-signature by an end user.

30. The method of claim 29, wherein upon receiving the notification, the remote computing device continues an e-signature workflow with the end user.

* * * * *